(12) United States Patent
Inoue et al.

(10) Patent No.: US 8,432,520 B2
(45) Date of Patent: *Apr. 30, 2013

(54) LIQUID CRYSTAL DISPLAY DEVICE

(75) Inventors: Yuichi Inoue, Atsugi (JP); Hidehiko Yamaguchi, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,761

(22) Filed: Apr. 16, 2012

(65) Prior Publication Data

US 2012/0257153 A1  Oct. 11, 2012

Related U.S. Application Data

(63) Continuation of application No. 12/441,445, filed as application No. PCT/JP2007/057467 on Apr. 3, 2007, now Pat. No. 8,159,640.

(30) Foreign Application Priority Data

Sep. 22, 2006  (JP) .................................. 2006-256781

(51) Int. Cl.
G02F 1/1337 (2006.01)
(52) U.S. Cl.
USPC .......................................... 349/129; 349/130
(58) Field of Classification Search ........... 349/129–130
See application file for complete search history.

(56) References Cited

U.S. PATENT DOCUMENTS

| | | | |
|---|---|---|---|
| 6,661,488 B1 | 12/2003 | Takeda et al. | |
| 6,710,837 B1 | 3/2004 | Song et al. | |
| 6,724,452 B1 | 4/2004 | Takeda | |
| 6,879,364 B1 | 4/2005 | Sasaki et al. | |
| 6,970,220 B2 * | 11/2005 | Park et al. | 349/129 |
| 7,218,369 B2 | 5/2007 | Song et al. | |
| 7,304,703 B1 | 12/2007 | Takeda et al. | |
| 8,159,640 B2 | 4/2012 | Inoue et al. | |
| 2004/0119924 A1 | 6/2004 | Takeda | |

(Continued)

FOREIGN PATENT DOCUMENTS

| | | |
|---|---|---|
| EP | 1 666 963 A1 | 6/2006 |
| JP | 2001-324710 | 11/2001 |

(Continued)

OTHER PUBLICATIONS

U.S. Appl. No. 12/441,445, filed Mar. 16, 2009; Inoue et al.

(Continued)

*Primary Examiner* — James Dudek
(74) *Attorney, Agent, or Firm* — Nixon & Vanderhye P.C.

(57) ABSTRACT

A liquid crystal display device in which alignment control in a vertical-alignment-type liquid crystal layer is excellent at a side portion or a corner portion of a pixel electrode. The liquid crystal display device includes a pixel electrode including openings of slits as an alignment control mechanism, a common electrode including linear protrusions as an alignment control mechanism, the electrodes opposed to each other, and a vertical-alignment-type liquid crystal layer sandwiched between the electrodes, wherein the linear protrusion is placed at a position where the linear protrusion controls alignment in the liquid crystal layer inside a position where an oblique electric field generated at the edge of an corner portion of the pixel electrode at the time when a voltage is applied between the electrodes controls the alignment in the liquid crystal layer.

3 Claims, 8 Drawing Sheets

U.S. PATENT DOCUMENTS

| | | |
|---|---|---|
| 2005/0024546 A1 | 2/2005 | Kubo et al. |
| 2006/0023149 A1 | 2/2006 | Lin et al. |
| 2006/0092366 A1 | 5/2006 | Inoue et al. |
| 2006/0098151 A1 | 5/2006 | Inoue et al. |
| 2009/0233393 A1 | 9/2009 | Jung et al. |

FOREIGN PATENT DOCUMENTS

| | | |
|---|---|---|
| JP | 2002-229038 | 8/2002 |
| JP | 2003-043488 | 2/2003 |
| JP | 2004-125847 | 4/2004 |
| JP | 2005-055880 | 3/2005 |
| JP | 2005-346082 | 12/2005 |
| JP | 2006-209143 | 8/2006 |
| JP | 2006-343775 | 12/2006 |
| WO | WO 01/88605 | 11/2001 |

OTHER PUBLICATIONS

International Search Report for PCT/JP2007/057467, mailed Jul. 3, 2007.

Japanese Office Action for JP 2008-535268 mailed Apr. 13, 2012.

* cited by examiner

| Overlapping width W(μm) of linear protrusion with pixel electrode | Evaluation of alignment observed (○: Favorable alignment with no transmittance loss) |
|---|---|
| 0 | × |
| 2 | △ |
| 4 | ○ |
| 6 | ○ |
| 8 | ○ |

LIQUID CRYSTAL DISPLAY DEVICE

This application is a Continuation of Ser. No. 12/441,445, filed Oct. 22, 2009 now U.S. Pat. No. 8,159,640, which is a 371 (national stage) of PCT/JP2007/057467, filed 3 Apr. 2007, which designates the U.S. and claims priority to Japanese Application No. 2006-256781, filed 22 Sep. 2006, the entire contents of each of which are all hereby incorporated by reference into this application.

BACKGROUND OF THE INVENTION

1. Field of the Invention

The present invention relates to a liquid crystal display device using a vertical alignment mode which has excellent image display quality.

2. Description of the Related Art

In recent years, a liquid crystal display device is in widespread use as a display of a household electrical appliance such as a personal computer and a television set. In the liquid crystal display device, a liquid crystal panel is used which includes two glass substrates between which a liquid crystal is filled in a space surrounded by a sealing member.

For the liquid crystal display device as described above, a liquid crystal display device using a vertical alignment mode is commercially practical, in which a liquid crystal layer possessing negative dielectric anisotropy is interposed between an opposed glass substrate pair such that liquid crystal molecules are aligned vertically, and when a voltage is applied to the liquid crystal layer, the liquid crystal molecules are controlled to be aligned in a plurality of inclined directions relative to the glass substrates.

In this liquid crystal display device using the vertical alignment mode, the liquid crystal molecules are aligned vertically relative to the opposed glass substrate pair in a state where no voltage is applied thereto which defines a non-driven state, so that light which passes through the liquid crystal layer has its polarization plane little changed. Hence, by providing and arranging polarizing plates in the position of crossed Nicols on and under the glass substrates, black display can be achieved almost perfectly in the state where no voltage is applied thereto, and thereby a high-contrast image is obtained.

There arises a problem of viewing angle dependency in this liquid crystal display device using the vertical alignment mode, a similar problem arising also in a conventional liquid crystal display device using a TN mode; however, solutions to the problem are found as follows. Since, in order to improve viewing angle characteristics in display, it is effective to create a plurality of domains in one pixel for controlling liquid crystal molecules aligned in a vertical direction to be aligned in a plurality of inclined directions that are different from one domain to another relative to the vertical direction, protrusions are provided on an alignment layer or openings are provided in an electrode in the liquid crystal display device in order to create these domains.

As shown in FIG. 6, vertical-alignment-type liquid crystal molecules 53 which possess negative dielectric anisotropy tend to get vertical to an electric field direction 54 when a voltage is applied between electrodes 51 and 52. In this case, azimuthal directions of the liquid crystal molecules 53 become at random as shown in FIG. 6 if there is nothing to control the azimuthal directions. In contrast, the azimuthal directions are determined if there provided protrusions 55 and openings 57 as shown in FIG. 7. In this case, when a voltage is applied, the liquid crystal molecules 53 in the vicinities of the protrusions 55 and the openings 57 first start to incline before the liquid crystal molecules 53 in the other regions start to incline, and then the liquid crystal molecules 53 in the other regions start to tilt as if propagating through the regions, whereby the azimuthal directions of the aligned liquid crystal molecules 53 are controlled. Besides, in FIG. 7, a reference numeral 58 indicates equipotential lines at the time when a voltage is applied, and a reference numeral 59 indicates an oblique electric field (a fringe field).

Next, a description of a specific example of use of the above-described alignment control mechanisms will be given. As shown in FIG. 8, on an array substrate, a pair of gate bus lines 11 and a pair of source bus lines 12 which are perpendicular to each other are arranged in a grid pattern, and a pixel electrode 51 is provided in a pixel region surrounded by the gate bus lines 11 and the source bus lines 12. In the pixel electrode 51, openings 57 of slits are formed to extend in an oblique direction. The openings 57 are provided and arranged to generate an oblique electric field (a fringe field) at the time when a voltage is applied and to control liquid crystal molecule alignment in order to improve viewing angle characteristics as mentioned above. The openings 57 which are oblique at a given angle are arranged to be vertically symmetrical in each pixel electrode 51 as shown in FIG. 8.

Under the common electrode 52 (not shown in FIG. 8), linear protrusions 55a to 55c are provided. The linear protrusions 55a to 55c which are oblique at a given angle are arranged to be vertically symmetrical in each pixel electrode 51 in FIG. 8, and are placed at substantially center positions between the adjacent openings 57. The linear protrusions 55a to 55c are provided and arranged to align liquid crystal molecules in given inclined directions relative to the vertical direction in order to improve viewing angle characteristics.

The widths of liquid crystal domains which are defined by the openings 57 and the linear protrusions 55a to 55c are set to be optimum considering a vertical-alignment-type liquid crystal layer to be used, a voltage to be applied at the time of the lowest tone or a voltage to be applied at the time of the highest tone (see Japanese Patent Application Unexamined Publication No. 2002-229038).

The pixel electrode 51 having a substantially rectangular shape has four corner portions 51b, 51c, 51d and 51e, and among them, the upper left corner portion 51b, the upper right corner portion 51d and the lower right corner portion 51e where a TFT 13 is not located are rounded. The rounding is made in order to adjust the areas of the corner portions 51b, 51d and 51e to the area of the lower left corner portion 51c with a notch where the TFT 13 is located and adjust parasitic capacitances of the pixel electrode 51 and the bus lines 11 and 12. However, as a result of setting the widths of the liquid crystal domains defined by the openings 57 and the linear protrusions 55a to 55c to be optimum, the upper right linear protrusion 55c and the lower right liner protrusion 55c could be placed outside the corner portions 51d and 51e respectively.

FIG. 9 is a cross-sectional view along the line C-C in FIG. 8. In this case, the position where the equipotential lines 58 at the edge of the corner portion 51e of the pixel electrode 51 fall down, in other words, the position where the alignment of the liquid crystal molecules 53 is controlled by the oblique electric field 59 which is generated at the edge of the corner portion 51e, is located inside the position where the alignment of the liquid crystal molecules 53 is controlled by the linear protrusion 55c. Due to this, the azimuthal directions of the liquid crystal molecules 53 are not determined in this range, resulting in poor alignment of the liquid crystal molecules 53. This kind of poor alignment is visually perceived as irregular luminance on a liquid crystal display screen, which becomes a cause of loss of display quality.

SUMMARY OF THE INVENTION

In order to overcome the problems described above, a preferred embodiment of the present invention provides a liquid crystal display device in which alignment control in a vertical-alignment-type liquid crystal layer is excellent at a side portion or a corner portion of a pixel electrode.

To achieve the objects and in accordance with the purpose of the present invention, a liquid crystal display device includes a pixel electrode including first alignment control mechanisms, a common electrode including second alignment control mechanisms, the pixel electrode and the common electrode being opposed to each other, and a vertical-alignment-type liquid crystal layer which is sandwiched between the pixel electrode and the common electrode, wherein the second alignment control mechanism in the vicinity of a side portion or a corner portion of the pixel electrode is placed at a position where the second alignment control mechanism controls liquid crystal alignment in the liquid crystal layer inside an edge of the side portion or an edge of the corner portion of the pixel electrode.

In this case, it is preferable that the second alignment control mechanism in the vicinity of the side portion or the corner portion of the pixel electrode is placed to partially overlap with the side portion or the corner portion of the pixel electrode. Further, it is preferable that an overlapping width of the second alignment control mechanism with the side portion or the corner portion of the pixel electrode is 4 μm or more. Furthermore, it is preferable that the second alignment control mechanism is placed along the edge of the side portion or the edge of the corner portion of the pixel electrode.

In addition, it is preferable that the first alignment control mechanisms are openings of slits which are formed in the pixel electrode, and the second alignment control mechanisms are linear protrusions which are formed on the common electrode.

According to the liquid crystal display device having the above-described configuration, since the second alignment control mechanism in the vicinity of the side portion or the corner portion of the pixel electrode is placed at the position where the second alignment control mechanism controls the liquid crystal alignment in the liquid crystal layer inside the edge of the side portion or the edge of the corner portion of the pixel electrode, the alignment control in the liquid crystal layer becomes excellent at the side portion or the corner portion of the pixel electrode.

In this case, when the second alignment control mechanism in the vicinity of the side portion or the corner portion of the pixel electrode is placed to partially overlap with the side portion or the corner portion of the pixel electrode, an aperture ratio becomes higher compared with a case where the second alignment control mechanism is entirely placed inside the side portion or the corner portion of the pixel electrode. Further, when the overlapping width of the second alignment control mechanism with the side portion or the corner portion of the pixel electrode is 4 μm or more, poor alignment is prevented. Furthermore, when the second alignment control mechanism is placed along the edge of the side portion or the edge of the corner portion of the pixel electrode, a region can be widened where liquid crystal molecule alignment is controlled inside the edge of the side portion or the edge of the corner portion of the pixel electrode.

In addition, when the first alignment control mechanisms are the openings of slits which are formed in the pixel electrode, and the second alignment control mechanisms are the linear protrusions which are formed on the common electrode, the first and the second alignment control mechanisms can be used as a combination which is widely used as an alignment control mechanisms for a vertical-alignment-type liquid crystal layer in a liquid crystal display device.

DETAILED DESCRIPTION OF PREFERRED EMBODIMENTS

Figure 1:
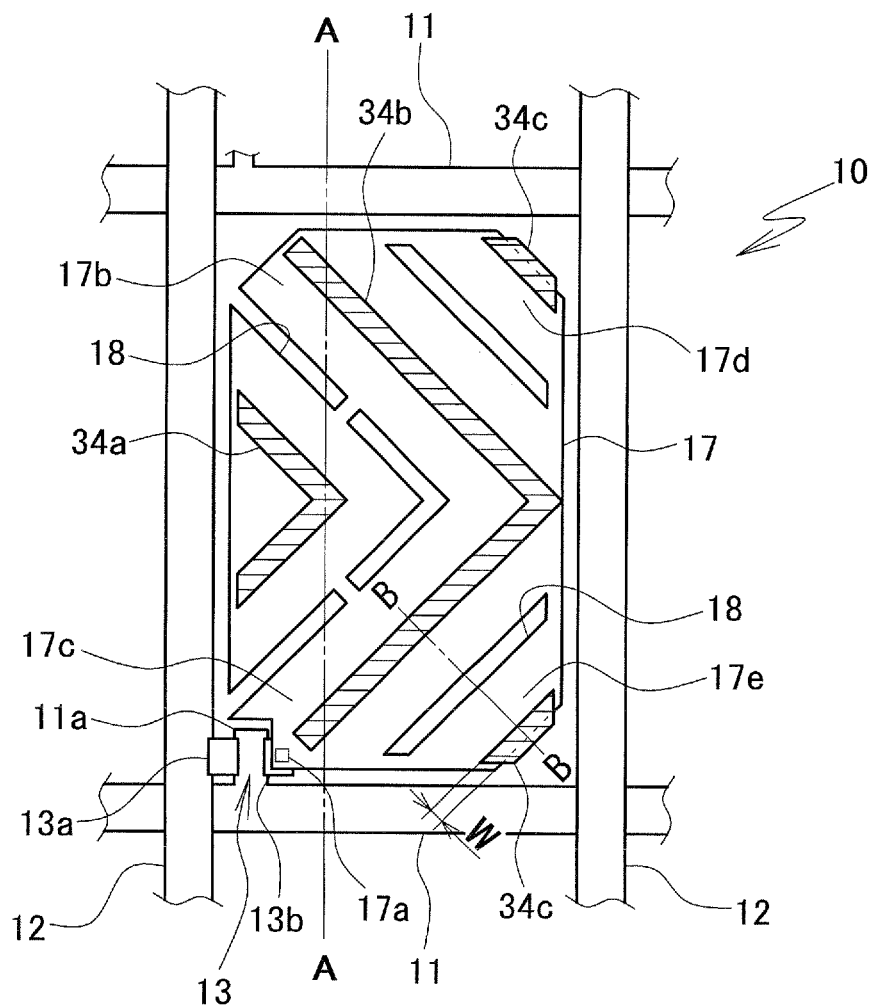
FIG. 1 is a magnified schematic plan view showing one pixel in a liquid crystal display device according to a preferred embodiment of the present invention.
Figure 2:
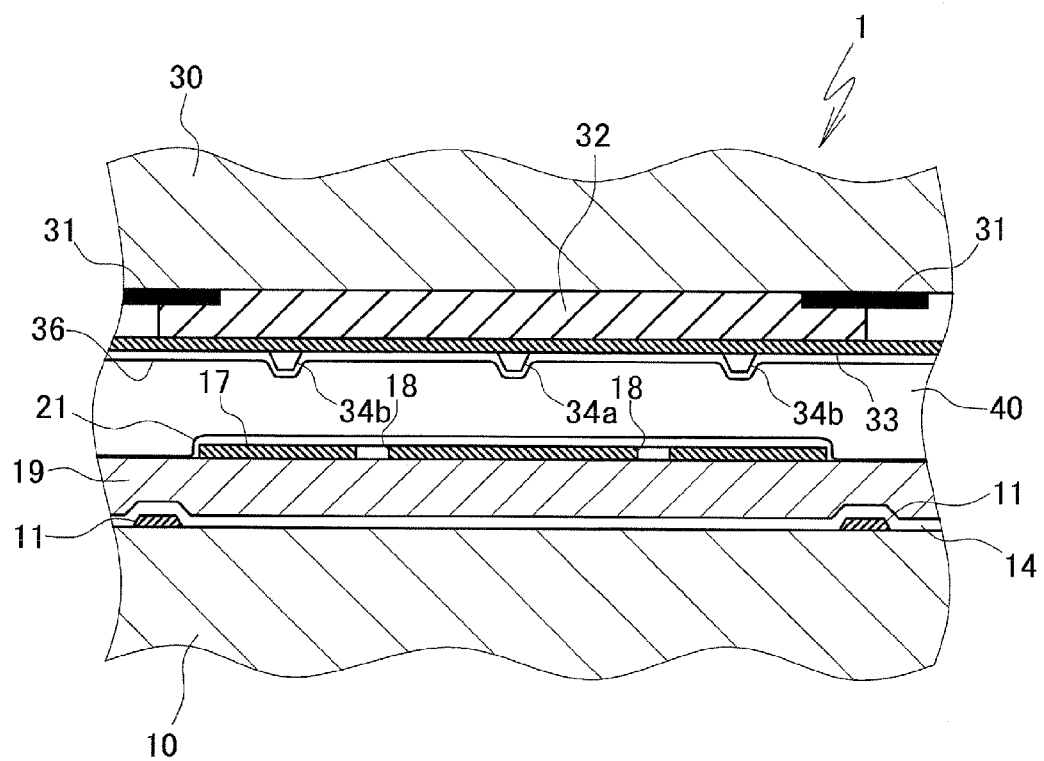
FIG. 2 is a cross-sectional view along the line A-A in FIG. 1.
Figures 3, 4:
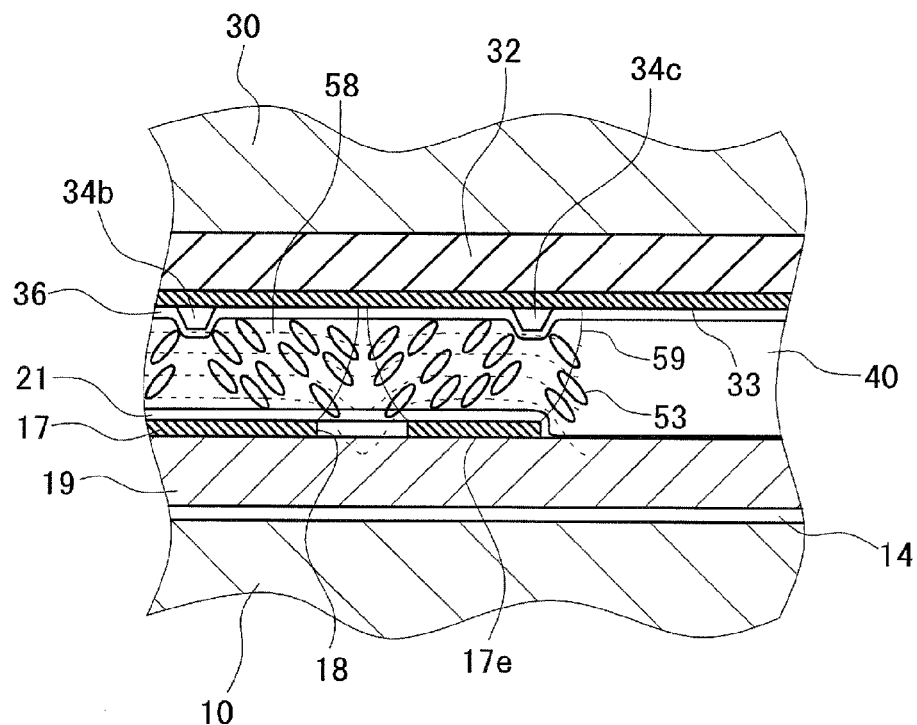
FIG. 3 is a cross-sectional view along the line B-B in FIG. 1
FIG. 4 is a table showing relations between overlapping widths W of a linear protrusion with a pixel electrode shown in FIG. 1, and alignment control in a liquid crystal layer.

A detailed description of a liquid crystal display device according to a preferred embodiment of the present invention will now be given with reference to the accompanying drawings. FIG. 1 is a magnified schematic plan view showing one pixel in the liquid crystal display device according to the preferred embodiment of the present invention. FIG. 2 is a cross-sectional view along the line A-A in FIG. 1. FIG. 3 is a cross-sectional view along the line B-B in FIG. 1

As shown in FIG. 2, in a liquid crystal display device 1, a liquid crystal layer 40 is interposed between a pair of opposed glass substrates 10 and 30 (10: the array substrate, 30: the color filter substrate), and on the glass substrate 10 which is located lower, pixel electrodes 17 are arranged in a matrix.

First, a description of the glass substrate (array substrate) 10 is provided. As shown in FIG. 1, on the periphery of each of the pixel electrodes 17, a pair of gate bus lines 11 and a pair of source bus lines 12 preferably made from aluminum are formed to be perpendicular to each other. The gate bus lines 11 and the source bus lines 12 cross each other such that the gate bus lines 11 are located lower than the source bus lines 12 at intersection portions thereof, and the gate bus lines 11 and the source bus lines 12 are electrically insulated from each other at the intersection portions.

At the lower-left intersection portion of the gate bus line 11 and the source bus line 12, a TFT (thin film transistor) 13 that defines a switching element is provided, to which a gate electrode 11a that defines a part of the gate bus line 11 is connected.

The gate bus line 11 and the gate electrode 11a are formed in one wiring layer (a first wiring layer). In other words, the gate bus line 11 and the gate electrode 11a are formed by patterning one conductive film. The gate bus line 11 and the gate electrode 11a are coated with a gate insulating film 14 preferably made from silicon nitride (see FIG. 2).

On the gate insulating film 14, a semiconductor layer (not shown) preferably made from amorphous silicon is formed to be integral with the TFT 13 so as to overlay the gate electrode 11a. On the gate insulating film 14, a source electrode 13a and a drain electrode 13b are formed on both sides of the semiconductor layer on the gate electrode 11a so as to be spaced apart from each other. The source electrode 13a is connected to the source bus line 12, and the drain electrode 13b is connected to the pixel electrode 17 via a contact hole 17a. The source bus lines 12, the source electrode 13a and the drain electrode 13b are formed in one wiring layer (a second wiring layer), which is not shown in FIG. 2.

The TFT 13 is on/off controlled by a scanning signal voltage provided by the gate electrode 11a of the gate bus line 11. A display signal voltage provided by the source electrode 13a via the source bus line 12 is provided to the pixel electrode 17 via the drain electrode 13b and the contact hole 17a of the pixel electrode 17.

The source bus line 12 and the TFT 13 are coated with an interlayer insulating film 19 which is formed on the gate insulating film 14. The interlayer insulating film 19 is preferably made from a photosensitive acrylic resin (photosensitive organic film) material, and is interposed between the TFT 13 and the first and second wiring layers (the gate bus line 11 and the source bus line 12), and the pixel electrode 17 in order to insulate the electric conductors from each other (see FIG. 2).

On the interlayer insulating film 19, one pixel electrode 17 is formed per pixel region. The pixel electrode 17 is preferably made from a transparent electric conductor such as an ITO (indium-tin oxide) material.

As shown in FIG. 1, the pixel electrode 17 having a substantially rectangular shape has four corner portions 17b to 17e, and among them, the upper left corner portion 17b, the upper right corner portion 17d and the lower right corner portion 17e where a TFT 13 is not located are rounded. In the pixel electrode 17, a plurality of openings 18 of slits are formed to extend in an oblique direction. The openings 18 are provided and arranged to generate an oblique electric field (a fringe field) at the time when a voltage is applied and to control liquid crystal molecule alignment in order to improve viewing angle characteristics. In the preferred embodiment of the present invention, the openings 18 which are oblique at a given angle are arranged to be vertically symmetrical in each pixel electrode 17 as shown in FIG. 1. In addition, a lower alignment layer 21 is formed on the pixel electrode 17 as shown in FIG. 2. The lower alignment layer 21 is preferably made from a polyimide resin.

A description of a method to manufacture the above-described glass substrate (array substrate) 10 will be provided. First, a single-layer or multi-layer conductor film made from materials such as tungsten, titanium, aluminum and chromium is formed on the glass substrate 10. This conductor film can be formed by a known method such as sputtering. The formed conductor film is then formed into a predetermined pattern preferably by photolithography. Thus, the gate bus lines 11 and the gate electrodes 11a in the predetermined pattern are formed.

Then, the gate insulating film 14 is formed. The gate insulating film 14 is preferably made from silicon nitride and is formed preferably by a plasma CVD method. On the insulating film 14, the semiconductor layers (not shown) of the TFTs 13, the source bus lines 12, the source electrodes 13a and the drain electrodes 13b are formed.

The semiconductor layers of the TFTs 13 are preferably made from n+ type amorphous silicon and are formed preferably by a plasma CVD method. The source bus lines 12, the source electrodes 13a and the drain electrodes 13b are formed in the same manner as the gate bus lines 11.

Then, the interlayer insulating film 19 made from a photosensitive acrylic resin (photosensitive organic film) material is formed, and contact holes are formed in the formed interlayer insulating film 19 preferably by photolithography. On the interlayer insulating film 19, the transparent conductive film made from the ITO material is formed preferably by sputtering. The formed ITO film is then formed into a predetermined pattern preferably by photolithography. Thus, the pixel electrodes 17 and the contact holes 17a in the predetermined pattern are formed.

After the pixel electrodes 17 are formed, the lower alignment layer 21 is formed. Specifically, a liquid alignment material consisting of polyimide or other material is applied preferably by a cylinder printing press or an inkjet printing press, and is then baked by heating the substrate preferably using a baking system. Thus, the solid-state lower alignment layer 21 is formed on the pixel electrodes 17. The glass substrate (array substrate) 10 is formed through the processes described above.

Next, a description of the glass substrate (color filter substrate) 30 will be provided. As shown in FIG. 2, the black matrix 31 is formed under the glass substrate 30. The areas on the glass substrate 10 where the gate bus lines 11, the source bus lines 12 and the TFT 13 are formed are arranged to be shielded from light by the black matrix 31. Under the glass substrate 30, a color layer 32 having one color among red (R), green (G), and blue (B) is formed in each pixel. In the preferred embodiment of the present invention, the red (R), green (G), and blue (B) color layers 32 are repeatedly aligned in order in a horizontal direction, while the color layers 32 having the same color are aligned in a vertical direction.

Under the color layer 32, a common electrode 33 common to each pixel is formed. The common electrode 33 is also made from a transparent electric conductor such as an ITO material. Under the common electrode 33, linear protrusions 34a, 34b and 34c are formed. As shown in FIG. 1, the linear protrusions 34a to 34c which are oblique at a given angle are arranged to be vertically symmetrical in each pixel electrode 17. The linear protrusions 34a to 34c are provided and arranged to align liquid crystal molecules in given inclined directions relative to the vertical direction in order to improve viewing angle characteristics. In addition, under the common electrode 33, an upper alignment layer 36 is formed to cover the linear protrusions 34a and 34b as shown in FIG. 2. The upper alignment layer 36 is preferably made from a polyimide resin.

A description of a method to manufacture the above-described glass substrate (color filter substrate) 30 will be provided. First, a BM resist (a photosensitive resin composition including a black coloring agent) or other material is applied on the glass substrate 30. The applied BM resist is formed into a predetermined pattern preferably by photolithography. Thus, the black matrix 31 in the predetermined pattern is formed.

Then, color inks made of a red, green and blue coloring photoresist materials (solutions in which pigments of certain colors are dispersed in photosensitive resins) are applied and formed into a predetermined pattern preferably by photolithography. Thus, the color layers 32 in the predetermined pattern are formed. On the color layers 32, the transparent conductive film made from the ITO material is formed using sputtering, and thus the common electrode 33 is formed.

Next, a resist (a photosensitive resin composition) or other material is applied on the common electrode 33. The applied resist is formed into a predetermined pattern preferably by photolithography. Thus, the linear protrusions 34a to 34c in the predetermined pattern are formed.

After the linear protrusions 34a to 34c are formed, the upper alignment layer 36 is formed. Specifically, a liquid alignment material consisting of polyimide or other material is applied preferably by a cylinder printing press or an inkjet printing press, and is then baked by heating the substrate preferably using a baking system. Thus, the solid-state upper alignment layer 36 is formed on the common electrode 33. The glass substrate (color filter substrate) 30 is formed through the processes described above.

The glass substrate (array substrate) 10 and the glass substrate (color filter substrate) 30 which have the above-described configurations sandwich the vertical-alignment-type liquid crystal layer 40 possessing negative dielectric anisotropy. In addition, polarizing plates (not shown) are placed under the glass substrate 10 and on the glass substrate 30. Transmission axes of the pair of polarizing plates are arranged to be substantially perpendicular to each other (crossed Nicols). The transmission axis of one of the polarizing plates is placed in the direction horizontal to a display surface, and is arranged to be oblique at about 45 degrees with respect to the extending directions of the openings 18 of slits and the linear protrusions 34a to 34c.

In bonding the glass substrate (array substrate) 10 and the glass substrate (color filter substrate) 30 together, a thermal-hardening or ultraviolet-cure sealing material and a common transfer material are applied to the substrate 10 or 30 preferably using a seal patterning device. Then, a liquid crystal is dropped filled in a display region on the substrate 10 or 30 preferably using a liquid crystal drop fill device, and the substrates 10 and 30 are bonded together in a reduced-pressure atmosphere to harden the sealing material. Thus, the liquid crystal display device 1 is prepared.

Figure 9:
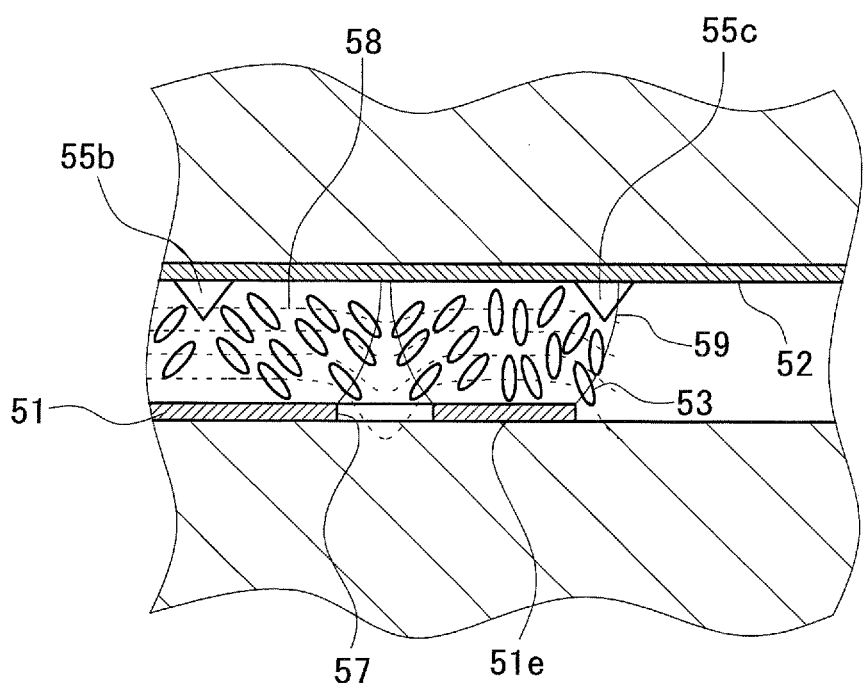
FIG. 9 is a cross-sectional view along the line C-C in FIG. 8.

Next, a description is provided referring to FIG. 3 that is a cross-sectional view along the line B-B in FIG. 1. As shown in FIG. 3, the linear protrusion 34c is placed on the common electrode 33 at a position where the linear protrusion 34c controls the alignment of the liquid crystal molecules 53 inside a position where the oblique electric field 59 which is generated at the edge of the corner portion 17e of the pixel electrode 17 at the time when a voltage is applied between the electrodes 33 and 17 controls the alignment of the liquid crystal molecules 53, so that the alignment control in the liquid crystal layer 40 is more excellent at the corner portion 17e of the pixel electrode 17 than the case as shown in FIG. 9. This is because azimuthal directions of the liquid crystal molecules 53 of which the alignment is controlled by the opening 18 provided in the corner portion 17e coincide with those of the liquid crystal molecules 53 of which the alignment is controlled by the linear protrusion 34c placed inside the edge of the corner portion 17e without being influenced by the oblique electric field 59 generated at the edge of the corner portion 17e.

In this case, if the linear protrusion 34c is placed to partially overlap with the corner portion 17e of the pixel electrode 17, an aperture ratio becomes higher compared with a case where the linear protrusion 34c is entirely placed inside the edge of the corner portion 17e. FIG. 4 is a table showing relations between overlapping widths W (μm) of the linear protrusion 34c with the corner portion 17e shown in FIG. 1, and evaluations of the alignment observed from a display screen. As shown in the table, when the overlapping width W is 0 μm, poor alignment is caused as described above and is rated as very unfavorable (X). When the overlapping width W is 2 μm, poor alignment is slightly caused and is rated as unfavorable (Δ). When the overlapping width W is 4 μm, 6 μm or 8 μm, no poor alignment is caused and is rated as favorable (○), which means favorable alignment with no transmittance loss. Thus, it is apparent that by securing the overlapping width of 4 μm or more, the alignment control in the liquid crystal layer 40 becomes more favorable.

Figure 5:
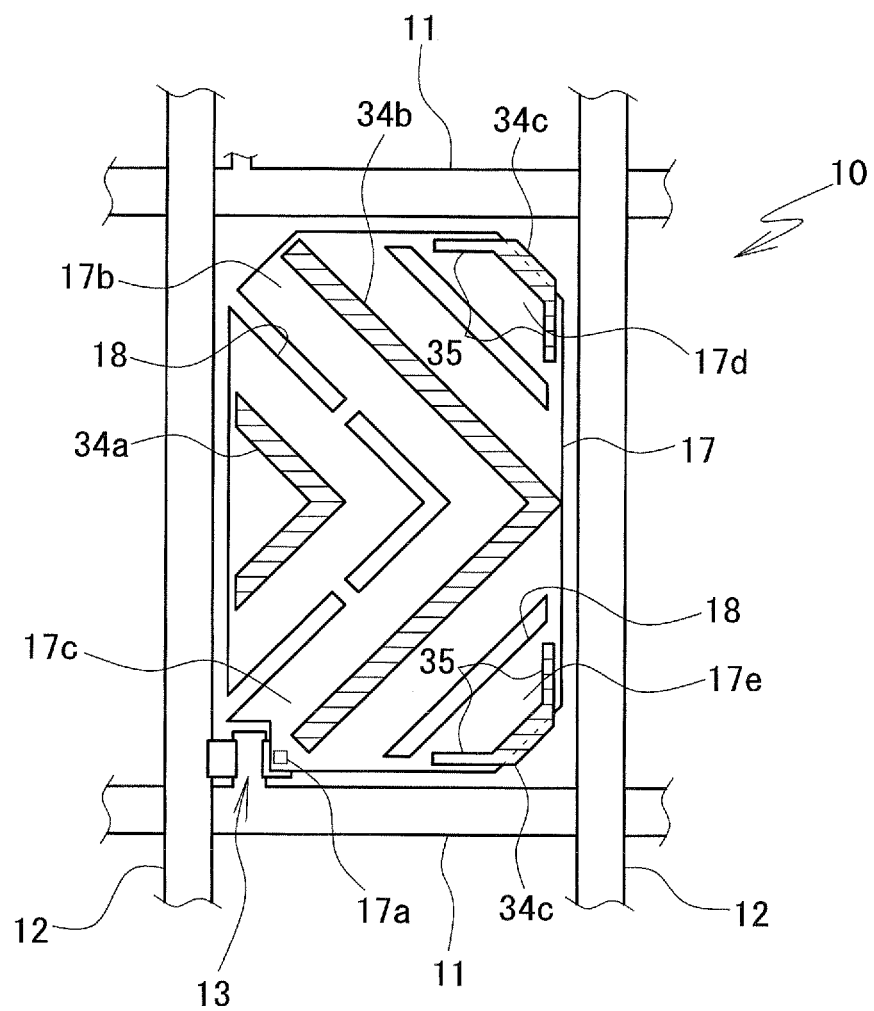
FIG. 5 is a magnified schematic plan view showing a modified example of the pixel in the liquid crystal display device.
Figure 6:
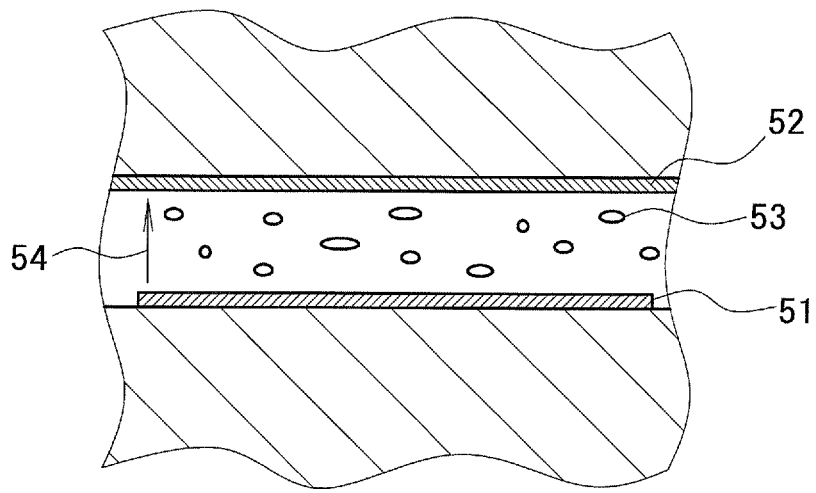
FIG. 6 is a view schematically showing an alignment state of liquid crystal molecules at the time when a voltage is applied in a case where no alignment control mechanism is provided.
Figure 6:
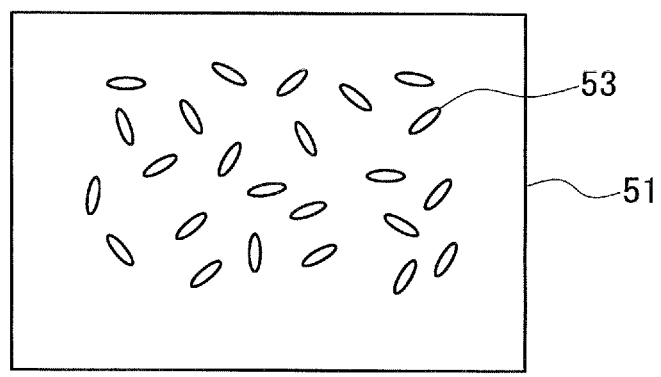
Figure 7:
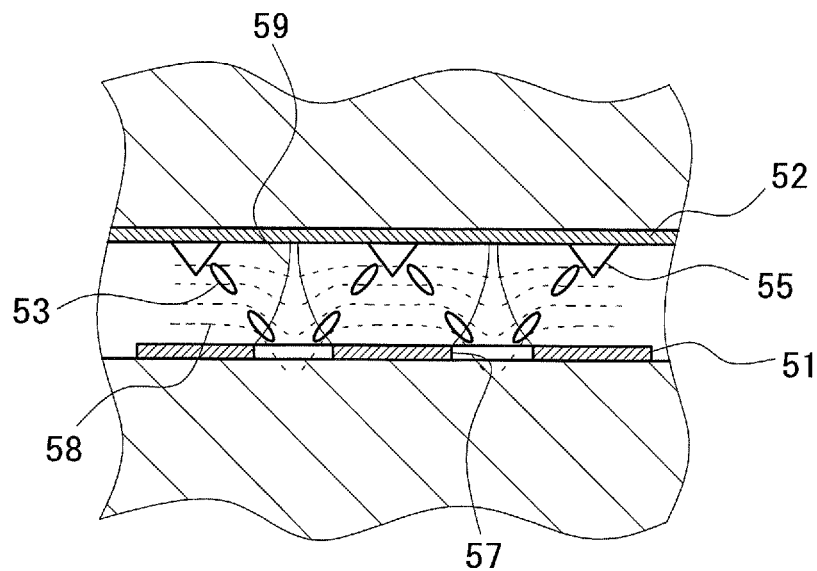
FIG. 7 is a view schematically showing an alignment state of liquid crystal molecules at the time when a voltage is applied in a case where linear protrusions and openings that define alignment control mechanisms are provided.
Figure 7:
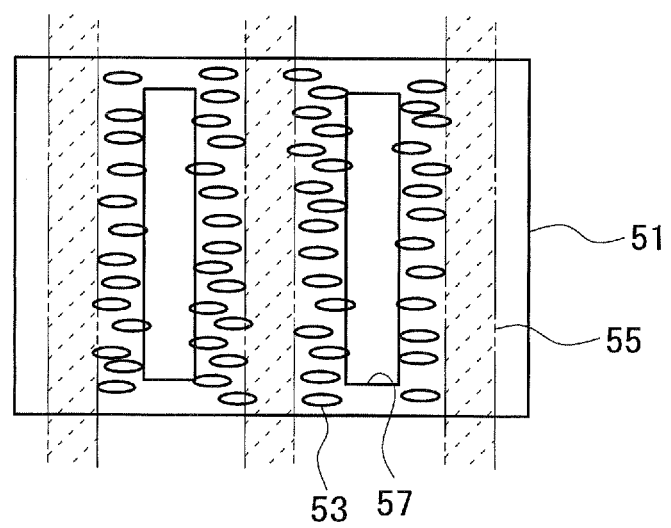
Figure 8:
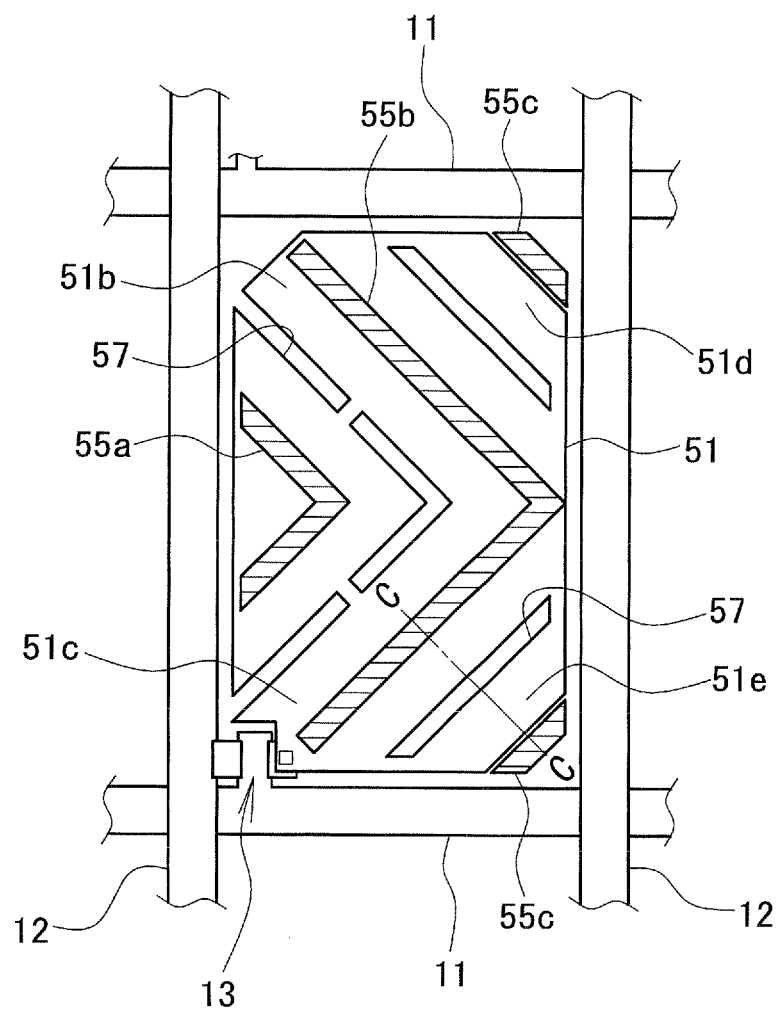
FIG. 8 is a magnified schematic plan view showing one pixel in a conventional liquid crystal display device.

FIG. 5 is a view showing a modified example of the pixel in the liquid crystal display device shown in FIG. 1. As shown in FIG. 5, it is preferable to provide auxiliary portions 35 which extend from the ends of the linear protrusions 34c in the horizontal direction and the vertical direction in order to widen a region where the alignment of the liquid crystal molecules 53 is controlled inside the edges of the corner portions 17d and 17e of the pixel electrode 17 or in order to improve capability for the alignment control. By thus placing the linear protrusions 34c and the auxiliary portions 35 along the edges of the corner portions 17d and 17e, the alignment control becomes more favorable.

The foregoing description of the preferred embodiment of the present invention has been presented for purposes of illustration and description. However, it is not intended to limit the present invention to the preferred embodiment described herein, and modifications and variations are possible as long as they do not deviate from the principles of the invention. For example, while the configuration in which openings of slits and linear protrusions are provided respectively to a pixel electrode and a common electrode as alignment control mechanisms has been described in the above-described preferred embodiment of the present invention, the present invention can be also applied to a configuration in which openings and linear protrusions are provided to electrodes opposite to the above described configuration. In addition, the present invention can be applied to a configuration in which openings of slits or linear protrusions are provided to both electrodes.

What is claimed is:

1. A liquid crystal display device comprising:
a pixel electrode structure comprising a pixel electrode and at least one first alignment control mechanism;
a common electrode structure comprising a common electrode and at least one second alignment control mechanism, the pixel electrode and the common electrode being opposed to each other with a liquid crystal layer sandwiched between at least the pixel electrode and the common electrode,
wherein the pixel electrode comprises at least one chamfered and/or rounded corner portion so as to define a non-right-angle-corner portion, the second alignment control mechanism in the vicinity of the non-right-angle-corner portion of the pixel electrode is placed at least at a position where the second alignment control mechanism controls liquid crystal alignment in the liquid crystal layer inside an edge of the non-right-angle-corner portion of the pixel electrode, and the second alignment control mechanism partially overlaps with and extends along an edge of the non-right-angle-corner portion of the pixel electrode,
wherein an overlapping width of the second alignment control mechanism with said edge of the non-right-angle-corner portion of the pixel electrode is at least 4 μm.

2. The liquid crystal display device of claim 1, wherein the liquid crystal layer is a vertical-alignment-type liquid crystal layer.

3. The liquid crystal display device of claim 1, wherein the first alignment control mechanism comprises openings and/or slits which are formed in the pixel electrode, and the second alignment control mechanism comprises protrusions supported by the common electrode.

\* \* \* \* \*